US008537146B1

(12) United States Patent
Nicklisch et al.

(10) Patent No.: US 8,537,146 B1
(45) Date of Patent: Sep. 17, 2013

(54) METHODS AND APPARATUS FOR TOGGLING BETWEEN GRAPHICS PROCESSING UNIT VIDEO SCANOUTS

(75) Inventors: Fred D. Nicklisch, Wuerselen (DE); Martin Schwarzer, Gemmenich (BE)

(73) Assignee: Nvidia Corporation, Santa Clara, CA (US)

( * ) Notice: Subject to any disclaimer, the term of this patent is extended or adjusted under 35 U.S.C. 154(b) by 1287 days.

(21) Appl. No.: 11/566,671

(22) Filed: Dec. 4, 2006

(51) Int. Cl.
*G06F 3/038* (2013.01)

(52) U.S. Cl.
USPC .................................. 345/204; 348/42; 353/7

(58) Field of Classification Search
USPC .................. 345/204, 214; 348/42–60; 353/7
See application file for complete search history.

(56) References Cited

U.S. PATENT DOCUMENTS

| | | | | |
|---|---|---|---|---|
| 4,704,627 A | * | 11/1987 | Yuyama et al. ................. | 348/43 |
| 4,979,033 A | * | 12/1990 | Stephens ......................... | 348/56 |
| 5,260,773 A | * | 11/1993 | Dischert ......................... | 348/42 |
| 5,523,886 A | * | 6/1996 | Johnson-Williams et al. .............................. | 359/464 |
| 5,801,705 A | * | 9/1998 | Kato et al. ...................... | 345/419 |
| 5,821,989 A | * | 10/1998 | Lazzaro et al. ................. | 348/56 |
| 6,040,852 A | * | 3/2000 | Stuettler ......................... | 348/43 |
| 6,348,916 B1 | * | 2/2002 | Jeong et al. .................... | 345/213 |
| 6,424,320 B1 | * | 7/2002 | Callway ......................... | 345/1.1 |
| 6,473,086 B1 | * | 10/2002 | Morein et al. ................. | 345/505 |
| 7,215,357 B1 | * | 5/2007 | Swift et al. ..................... | 348/56 |
| 7,525,548 B2 | * | 4/2009 | Azar et al. ..................... | 345/504 |
| 7,616,206 B1 | * | 11/2009 | Danilak ......................... | 345/505 |
| 7,649,537 B2 | * | 1/2010 | Campbell et al. ............. | 345/502 |
| 7,698,579 B2 | * | 4/2010 | Hendry et al. ................. | 713/300 |
| 7,721,118 B1 | * | 5/2010 | Tamasi et al. ................. | 713/300 |
| 8,350,780 B1 | * | 1/2013 | Cook ............................... | 345/8 |
| 2006/0267992 A1 | * | 11/2006 | Kelley et al. .................. | 345/502 |

\* cited by examiner

*Primary Examiner* — Jason Mandeville

(74) *Attorney, Agent, or Firm* — Patterson & Sheridan, L.L.P.

(57) ABSTRACT

One embodiment of the invention sets forth a method for toggling between video scanouts generated by a plurality of graphics processing units. The method includes the steps of transmitting a set of programming instructions to a first graphics processing unit and to a second graphics processing unit, configuring a first state machine within the first graphics processing unit to cause a trigger signal to be included with each video frame transmitted by the first graphics processing unit for display, and configuring a second state machine within the second graphics processing unit to cause a trigger signal to be included with each video frame transmitted by the second graphics processing unit for display. The method advantageously creates a direct relationship between the transmission frequencies of the individual graphics processing units and the switching frequency of a video bridge, not relying on a driver to control the video bridge switching.

22 Claims, 2 Drawing Sheets

METHODS AND APPARATUS FOR TOGGLING BETWEEN GRAPHICS PROCESSING UNIT VIDEO SCANOUTS

BACKGROUND OF THE INVENTION

1. Field of the Invention

Embodiments of the present invention relate generally to video processing and more specifically to automatically toggling between graphics processing unit video scanouts.

2. Description of the Related Art

In typical stereo video applications, multiple graphics processing units (GPUs) may be used to generate and transmit video frames for display. For example, one GPU may generate video content for one eye, and another GPU may generate video content for the other eye. In such scenarios, a switching mechanism, frequently residing within a video bridge, toggles back and forth between the GPUs, first transmitting a video frame generated by one GPU to a display device and then transmitting a video frame generated by the other GPU to the display device. In order to achieve high-quality stereo video on the display device, the frames generated by the two GPUs should be transmitted to the display device at a constant frequency of at least 120 Hertz (Hz), where each GPU transmits its respective video frames at a frame rate of 60 Hz.

In many current systems designed for stereo video, the software driver used to control the GPUs is also used to control the switching mechanism in the video bridge. One drawback of this approach is that latencies associated with transmitting the appropriate commands from the software driver to the video bridge switching mechanism oftentimes prevent the switching mechanism in the video bridge from being toggled at or above the 120 Hz frequency or toggled at a consistent frequency, both of which are needed for high-quality stereo video. Further, using the software driver to control the switching mechanism requires the software driver to constantly transmit control signals to the video bridge, even when the software driver is not performing any other work. Thus, other inefficiencies are introduced into the system.

As the foregoing illustrates, there is a need in the art for a more reliable way to control the switching mechanism in a multi-GPU system configured for stereo video.

SUMMARY OF THE INVENTION

One embodiment of the invention sets forth a method for toggling between video scanouts generated by a plurality of graphics processing units. The method includes the steps of transmitting a set of programming instructions to a first graphics processing unit and to a second graphics processing unit, configuring a first state machine within the first graphics processing unit to cause a trigger signal to be included with each video frame transmitted by the first graphics processing unit for display, and configuring a second state machine within the second graphics processing unit to cause a trigger signal to be included with each video frame transmitted by the second graphics processing unit for display.

One advantage of the disclosed method is that it creates a direct relationship between the transmission frequencies of the individual graphics processing units and the switching frequency of a video bridge and does not rely on a software driver to control the switching of the video bridge. Consequently, the method is more robust and accurate, not suffering from software driver and other latencies that afflict prior art systems. Further, the method enables the responsibility of driving the video bridge to be offloaded from the software driver to the graphics processing units, thereby producing additional systemic efficiencies relative to prior art systems.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, wherever possible, to designate identical elements that are common to the figures.

DETAILED DESCRIPTION

Figure 1:
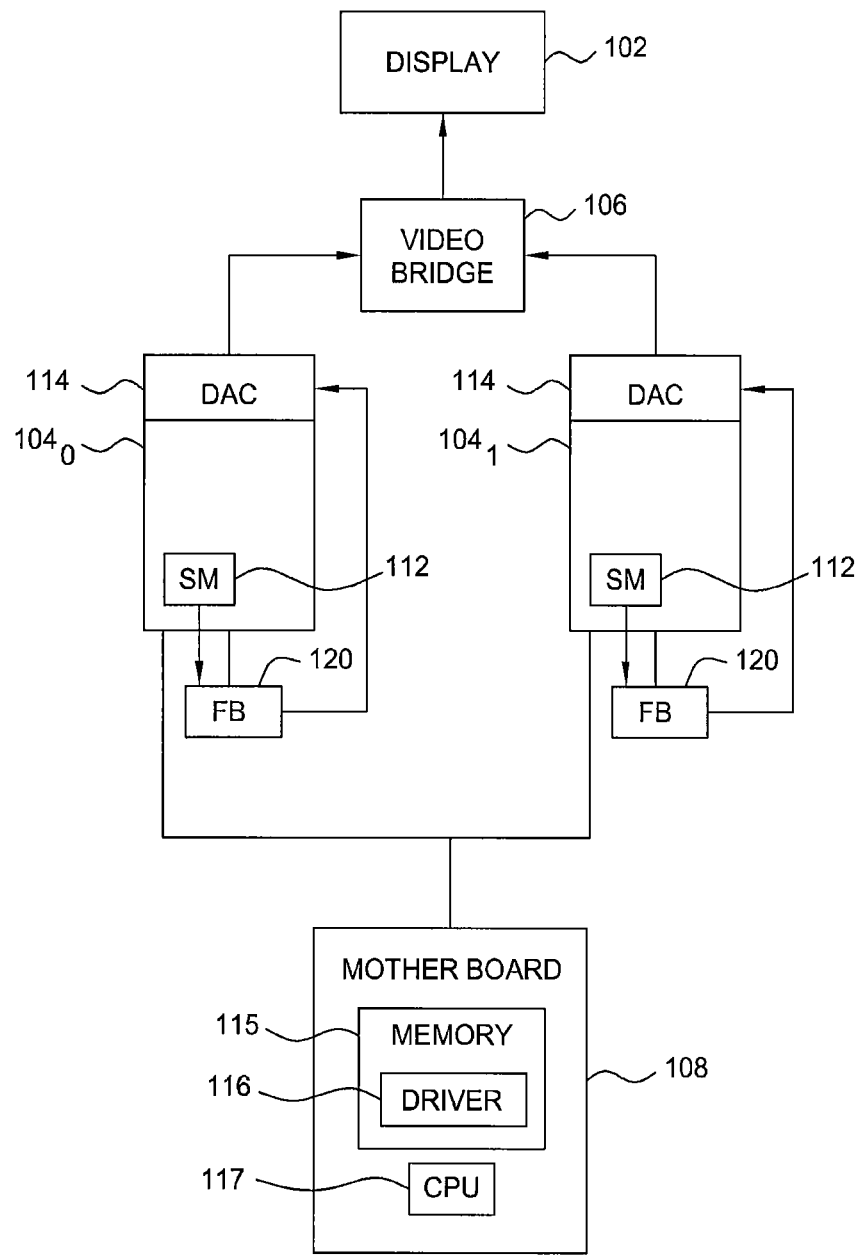
FIG. 1 is a block diagram illustrating a computing device configured to implement one or more aspects of the present invention.

FIG. 1 is a block diagram illustrating a computing device 100 configured to implement one or more aspects of the present invention. The computing device 100 may be any type of computing device that includes a plurality of graphics processing units (GPUs) configured to output video data. For example, the computer device 100 may be, without limitation, a desk-top computer, a portable laptop computer, a server computer, a personal digital assistant, a set-top box or any other like computing device. As shown, the computing device 100 includes, without limitation, a motherboard 108, a pair of GPUs $104_0$ and $104_1$, and a video bridge 106. The motherboard 108 is the main circuit board of the computing device 100 and contains, among other things, a central processing unit (CPU) 117 and a system memory 115. The system memory 115, which may comprise random access memory (RAM), read only memory (ROM), and/or persistent memory (Flash), includes a software driver program 116 directs the activities of the GPUs 104.

The GPUs 104 are configured to render video data for scan out and display on a display unit 102. Each GPU 104 is coupled to a frame buffer 120 and includes a digital-to-analog converter (DAC) 114. The frame buffer 120 serves as the local memory unit on the GPU 104 and stores the image data prior to the data being displayed. The frame buffer 120 is also configured to scan out (i.e., output) the digital image data to the DAC 114. The DAC 114 receives the digital data from the frame buffer 120 and converts the signal into an analog format that is ultimately utilized by the display unit 102. The analog image data is then forwarded from the DAC 114 to the video bridge 106 and is then transmitted to the display unit 102.

In alternative embodiments, digital signals may be transmitted from the frame buffers 120 to the video bridge 106, and the video bridge 106 may include a DAC. In such cases, the transmitted digital signals may be, for example, a digital video interface (DVI) signal group or part of a low voltage differential signaling (LVDS) link.

Each GPU 104 also includes a local state machine 112, which may comprise any device or system that stores status data in a plurality of registers. The state machine 112 is configured to receive input from one or more sources that changes the status data, thereby causing the state machine 112 to perform a particular action or produce a particular output. As described in greater detail herein, each state machine 112 receives program data from the software driver 116 for controlling how the video bridge 106 toggles between the display data scanned out from each of the CPUs 104. More particularly, the state machines 112 can be configured to include trigger signals in the video data scanned out by the GPUs 104. The trigger signals then drive the video bridge 106 to toggle at a constant frequency. In this fashion, the display data output to display unit 102 may be more precisely and robustly controlled relative to prior art approaches.

In one embodiment, the GPUs 104 are configured for a stereo video application, where GPU $104_0$ is designated as the processing unit for image data for the right eye, and GPU $104_1$ is designated as the processing unit for image data for the left eye. The software driver 116 transmits a programming signal to each of the GPUs 104. Each programming signal includes programming commands that are used to configure the state machines 112 to drive the video bridge 106 at a desired frequency. For example, the programming commands may configure each state machine 112 to cause one of the GPUs 104 to append a trigger signal to each video frame transmitted by that GPU for display. For example, the programming instructions may configure state machine 112 within GPU $104_0$ to cause GPU $104_0$ to include an indicator bit in the VBLANK_ODD (vertical blanking) message at the end of each video frame transmitted to the video bridge 106 that instructs the video bridge 106 to toggle (i.e., switch the connection from GPU $104_0$ to GPU $104_1$). As is well-known, a VBLANK message is a type of signal transmitted at the end of a video frame that carries information other than video data. Thus, upon reading the indicator bit included at the end of a frame transmitted by GPU $104_0$, the video bridge 106 toggles its internal switching means and begins receiving the next video frame from GPU $104_1$ and transmitting that video frame onward to the display unit 102. Similarly, the programming instructions may configure state machine 112 within GPU $104_1$ to cause GPU $104_1$ to include an indicator bit in the VBLANK_EVEN message at the end of each video frame transmitted to video bridge 106 that instructs the video bridge 106 to toggle (i.e., switch the connection from GPU $104_1$ to GPU $104_0$). Again, upon reading the indicator bit included at the end of a frame transmitted by $GPU_1$, the video bridge 106 toggles its internal switching means and begins receiving the next video frame from GPU $104_0$ and transmitting that video frame onward to the display unit 102.

In alternative embodiments, other mechanism may be employed to cause the video bridge 106 to toggle. For example, a global command may be transmitted to the video bridge 106 that causes the video bridge 106 to toggle its internal switching means in response to receiving a VBLANK message from either of the frame buffers 120. Such a global command may be embedded as a bit within one of the VBLANK messages, or the global command may be a direct physical signal asserted by one of the GPUs 104 through a pin in the video bridge 106. The software driver 116 would configure one or both of the GPUs 104, through the programming commands, to transmit the global command to the video bridge 106.

By programming the state machines 112 in the GPUs 104 in this manner, the present invention is able to program the GPUs to toggle the video bridge 106 at a predefined rate. For example, each GPU 104 may be configured to transmit video frames to the video bridge 106 at a frequency of one hundred twenty times a second, or 120 Hertz (Hz). If each video frame includes an indicator bit in the VBLANK message, as described herein, then the display unit 102 is driven at a constant rate of 120 Hz, which is a desirable frequency for high-quality stereo video.

Those skilled in the art realize that, in alternative embodiments, the video bridge may be replaced by any like switching mechanism. In another alternative embodiment, the video bridge may be integrated into one of the GPUs 104. In addition, the display unit 102 may include a cathode ray tube (CRT) display or any other type of display screen that known in the art that is able to operate as contemplated by the present invention.

Figure 2:
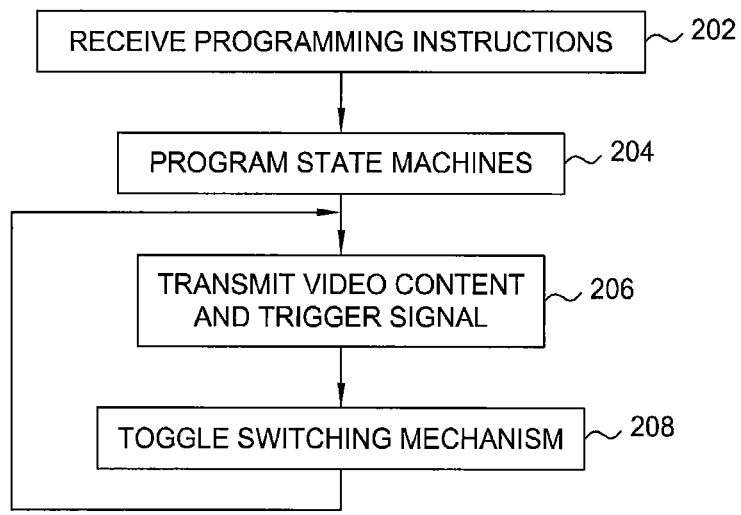
FIG. 2 is a flow diagram of method steps for toggling between video scanouts produced by a plurality of GPUs, in accordance with the present invention.

FIG. 2 is a flow diagram of method steps for toggling between video scanouts produced by a plurality of GPUs, in accordance with the present invention. Although the method is described in conjunction with the system of FIG. 1, persons skilled in the art will understand that any system configured to perform the method steps, in any order, is within the scope of the invention.

The method 200 begins at step 202, where the software driver 116 transmits programming instructions to each of the GPUs 104. In step 204, the state machines 112 are configured based on the programming instructions. In one embodiment, the program instructions configure state machine 112 within GPU $104_0$ to cause GPU $104_0$ to include an indicator bit (i.e., a trigger signal) in the VBLANK_ODD message at the end of each video frame transmitted to the video bridge 106 by GPU $104_0$ that instructs the video bridge 106 to switch its connection from GPU $104_0$ to GPU $104_1$. Similarly, the program instructions configure state machine 112 within GPU $104_1$ to cause GPU $104_1$ to include an indicator bit (i.e., a trigger signal) in the VBLANK_EVEN message at the end of each video frame transmitted to the video bridge 106 by GPU $104_1$ that instructs the video bridge 106 to switch its connection from GPU $104_1$ back to GPU $104_0$.

In step 206, a first GPU (e.g., GPU $104_0$) transmits a video frame to display unit 102 for display via the video bridge 106. In step 208, when video bridge 106 encounters or reads the indicator bit in the VBLANK_ODD signal at the end of the transmitted video frame, the video bridge 106 toggles its switching means from GPU $104_0$ to GPU $104_1$. The method then returns to step 206, where the other GPU (e.g., GPU $104_1$) transmits a video frame to display unit 102 for display via the video bridge 106. In step 208, when the video bridge 106 encounters or reads the indicator bit in the VBLANK_EVEN signal at the end of the transmitted video frame, the video bridge 106 toggles its switching means from GPU $104_0$ to GPU $104_1$. The method then returns again to step 206, wherein GPU $104_0$ transmits the next video frame to display unit 102 for display via the video bridge 106.

In this fashion, the GPUs 104 drive the video bridge 106 to toggle back and forth between the GPUs 104 at exactly twice the rate at which the GPUs 104 are individually configured to transmit video frames for display. This approach advantageously creates a direct relationship between the transmission frequencies of the individual GPUs and the switching frequency of the video bridge 106 and does not rely on the software driver 116 to control the switching of the video bridge 106. Consequently, the approach is more robust and accurate, not suffering from software driver and other latencies that afflict prior art systems. Further, the approach offloads the responsibility of driving the video bridge 106 from the software driver 116 to the GPUs 104, thereby producing additional systemic efficiencies relative prior art systems.

Finally, to disable the toggling functionality described herein, in one embodiment, the software driver 116 simply reconfigures the state machines 112 such that no indicator bits are included in the VBLANK signals of the video frames transmitted by the CPUs 104.

While the foregoing is directed to embodiments of the present invention, other and further embodiments of the invention may be devised without departing from the basic scope thereof. For example, although only two CPUs are depicted in FIG. 1, the number of GPUs within the computing device 100 in no way limits the scope of the present invention. In alternative embodiments, the GPUs may be coupled together over a Peripheral Component Interface (PCI) Express bus (not shown) and may be further configured using Scalable Link Interface (SLI) technology developed by Nvidia Corporation of Santa Clara, Calif. to operate in a master-slave relationship when taking on various processing tasks, such as video processing. Thus, in this fashion, more than one GPU can be used to produce the video frames for each of the right eye and the left eye. These GPUs can use alternate-frame rendering, split-frame rendering or other rendering technique to generate each video frame. The scope of the present invention is therefore determined by the claims that follow.

We claim:

1. A method for toggling between video scanouts generated by a plurality of graphics processing units to produce a stereoscopic image, the method comprising:
   transmitting a set of programming instructions to a first graphics processing unit configured to generated video frames for display and to a second graphics processing unit configured to generated video frames for display;
   configuring, via a first instruction in the set of programming instructions, a first state machine within the first graphics processing unit to include a first indicator bit within a vertical blanking signal at the end of each video frame transmitted by the first graphics processing unit for display; and
   configuring, via a second instruction in the set of programming instructions, a second state machine within the second graphics processing unit to include a second indicator bit within a vertical blanking signal at the end of each video frame transmitted by the second graphics processing unit for display,
   wherein the first indicator bit is configured to cause a video bridge to toggle an output of the video bridge so that the video bridge transmits a video frame associated with the second graphics processing unit,
   wherein the second indicator bit is configured to cause the video bridge to toggle the output of the video bridge so that the video bridge transmits a video frame associated with the first graphics processing unit, and
   wherein the first graphics processing unit is configured to generate video data corresponding to a first perspective, and the second graphics processing unit is configured to generate video data corresponding to a second perspective, to produce the stereoscopic image.

2. The method of claim 1, further comprising the step of transmitting a first video frame to a display unit for display, wherein the first video frame is generated by the first graphics processing unit.

3. The method of claim 2, further comprising the step of reading the indicator bit included in the first video frame.

4. The method of claim 3, further comprising the step of toggling a switching means, in response to reading the indicator bit included in the first video frame, such that the display unit receives video frames transmitted by the second graphics processing unit, but not video frames transmitted by the first graphics processing unit.

5. The method of claim 4, further comprising the step of transmitting a second video frame to the display unit for display, wherein the second video frame is generated by the second graphics processing unit.

6. The method of claim 5, further comprising the step of reading the indicator bit included in the second video frame.

7. The method of claim 6, further comprising the step of toggling the switching means, in response to reading the indicator bit included in the second video frame, such that the display unit receives video frames transmitted by the first graphics processing unit, but not video frames transmitted by the second graphics processing unit.

8. The method of claim 7, further comprising the steps of transmitting a second set of programming instructions to the first graphics processing unit and to the second graphics processing unit, wherein the second set of programming instructions configure the first state machine such that indicator bits are not included in video frames transmitted by the first graphics processing unit for display and configure the second state machine such that indicator bits are not included in the video frame transmitted by the second graphics processing unit for display.

9. A computing device configured to toggle between video scanouts generated by a plurality of graphics processing units to produce a stereoscopic image, the computing device comprising:
   a first graphics processing unit having a first state machine and configured to generate video frames for display;
   a second graphics processing unit having a second state machine and configured to generate video frames for display;
   a software driver configured to transmit a set of programming instructions to the first graphics processing unit and to the second graphics processing unit; and
   a video bridge configured to select, from the first graphics processing unit and the second graphics processing unit, video frames for display;
   wherein the programming instructions configure the first state machine to include a first indicator bit within a vertical blanking signal at the end of each video frame transmitted by the first graphics processing unit for display,
   wherein the programming instructions configure the second state machine to include a second indicator bit within a vertical blanking signal at the end of each video frame transmitted by the second graphics processing unit for display,
   wherein the first indicator bit is configured to cause the video bridge to toggle an output of the video bridge so that the video bridge transmits a video frame associated with the second graphics processing unit,
   wherein the second indicator bit is configured to cause the video bridge to toggle the output of the video bridge so that the video bridge transmits a video frame associated with the first graphics processing unit, and
   wherein the first graphics processing unit is configured to generate video data corresponding to a first perspective, and the second graphics processing unit is configured to generate video data corresponding to a second perspective, to produce the stereoscopic image.

10. The computing device of claim 9, wherein the video bridge has a switching means that configures the video bridge for receiving display data from either the first graphics processing unit or the second graphics processing unit.

11. The computing device of claim 10, wherein the first graphics processing unit is further configured to transmit a first video frame to a display unit for display via the video bridge.

12. The computing device of claim 11, wherein the video bridge is configured to read the indicator bit included with the first video frame.

13. The computing device of claim 12, wherein, in response to the indicator bit included with the first video frame, the video bridge is configured to toggle the switching means to transmit to the display unit video frames received from the second graphics processing unit, but not video frames received from the first graphics processing unit.

14. The computing device of claim 13, wherein the second graphics processing unit is further configured to transmit a second video frame to the display unit for display via the video bridge.

15. The computing device of claim 14, wherein the video bridge is configured to reach the indicator bit included with the second video frame.

16. The computing device of claim 15, wherein, in response to the indicator bit included with the second video frame, the video bridge is configured to toggle the switching means to transmit video frames to the display unit received from the first graphics processing unit, but not video frames received from the second graphics processing unit.

17. The computing device of claim 16, wherein the software driver is further configured to transmit a second set of programming instructions to the first graphics processing unit and to the second graphics processing unit, wherein the second set of programming instructions configure the first state machine such that indicator bits are not included with video frames transmitted by the first graphics processing unit for display and configure the second state machine such that indicator bits are not included with video frames transmitted by the graphics processing unit for display.

18. The computing device of claim 9, further comprising a display unit for displaying the video frames generated by the first graphics processing unit and the second graphics processing unit.

19. The method of claim 1, wherein the first indicator bit and the second indicator bit are configured to cause the video bridge to alternately output a frame from the first graphics processing unit and a frame from the second graphics processing unit.

20. The computing device of claim 9, wherein the first indicator bit and the second indicator bit are configured to cause the video bridge to alternately output a frame from the first graphics processing unit and a frame from the second graphics processing unit.

21. The method of claim 19, wherein the set of programming instructions are configured to cause the first graphics processing unit and the second graphics processing unit to toggle at a predefined frequency.

22. The computing device of claim 19, wherein the programming instructions are configured to cause the video bridge to toggle at a predefined frequency.

* * * * *

UNITED STATES PATENT AND TRADEMARK OFFICE
CERTIFICATE OF CORRECTION

PATENT NO. : 8,537,146 B1  
APPLICATION NO. : 11/566671  
DATED : September 17, 2013  
INVENTOR(S) : Nicklisch et al.

Page 1 of 1

It is certified that error appears in the above-identified patent and that said Letters Patent is hereby corrected as shown below:

In the Claims:

Column 8, Claim 22, Line 26, please delete "19" and insert --20-- therefor.

Signed and Sealed this
Nineteenth Day of November, 2013

Teresa Stanek Rea
*Deputy Director of the United States Patent and Trademark Office*